INVENTOR.
Cornelius B. McAllister
BY
Fishburn and Gold
ATTORNEYS.

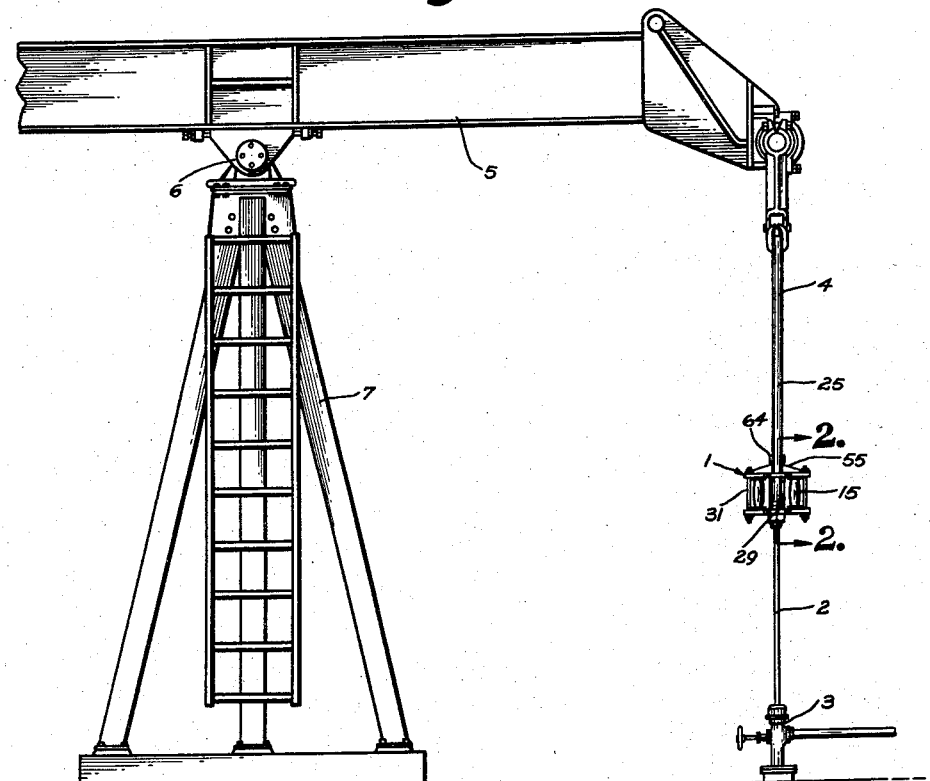

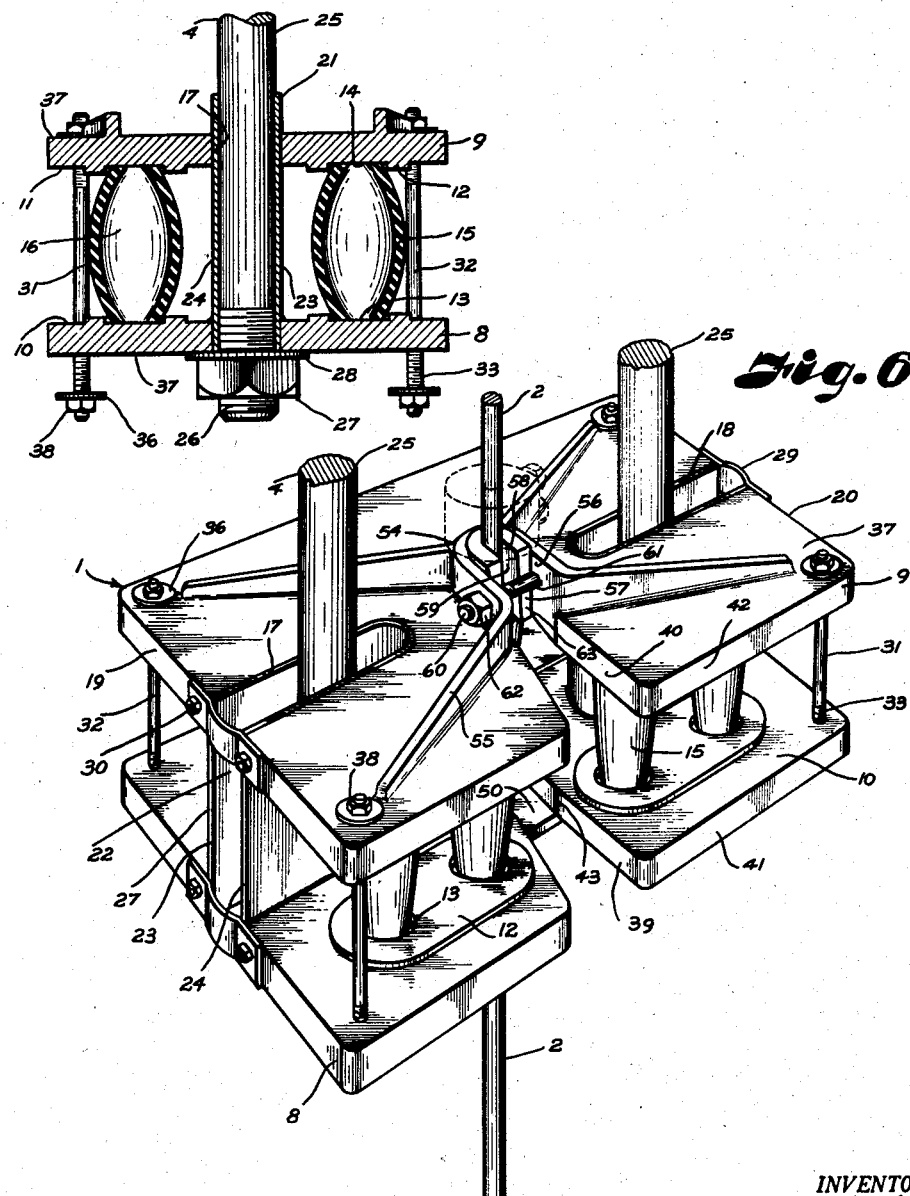

United States Patent Office 2,925,266
Patented Feb. 16, 1960

2,925,266

POLISH ROD SHOCK ABSORBER

Cornelius B. McAllister, Tulsa, Okla.

Application June 18, 1958, Serial No. 742,933

5 Claims. (Cl. 267—70)

This invention relates to shock absorbers, and more particularly to shock absorbers for use with well pumping equipment as at the connection between a polish or sucker rod and hangers from a walking beam or the like.

Shock absorbing devices having cushioning units have been used as connectors between hangers on walking beams and polish or sucker rods. However, in such structures, as well as other types of connectors in use, the polish rod has a clamp secured thereon which rests on the connector to suspend the polish rod therefrom. Substantial loads are applied to the polish rods and in pumping operations there are reversals or changes of forces with no additional support or guide for the upper portion of the polish rod, and this results in vibration, wear and breakage of the rods and other parts of the operating structure.

The principal objects of the present invention are to provide a polish rod shock absorber with suitable guides or supports to reduce the vibration and wear of the polish rod; to provide such a shock absorber capable of being easily and quickly incorporated in present standard well equipment to reduce rod breakage and wear; and to provide a polish rod shock absorber that is efficient for such purposes and that supports the polish rod and the portions movable relative thereto.

In accomplishing these and other objects of the present invention, I have provided improved details of structure, the preferred form of which is illustrated in the accompanying drawings, wherein:

Fig. 1 is a side elevation of well pumping equipment including a walking beam and hangers attached to the polish rod with a shock absorber embodying the features of the present invention.

Fig. 2 is a vertical sectional view through the shock absorber and hangers on the line 2—2, Fig. 1.

Fig. 5 is a vertical sectional view through the shock absorber on the line 5—5, Fig. 2.

Fig. 6 is a perspective view of the shock absorber structure.

Figure 3:
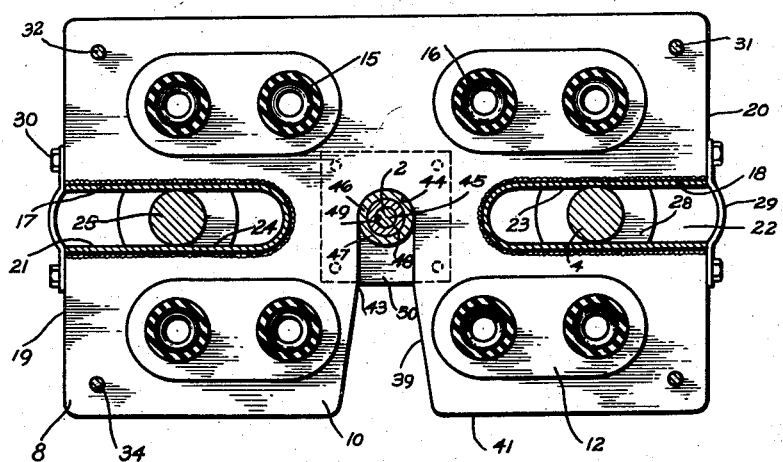
Fig. 3 is a horizontal sectional view through the shock absorber on the line 3—3, Fig. 2.
Figure 4:
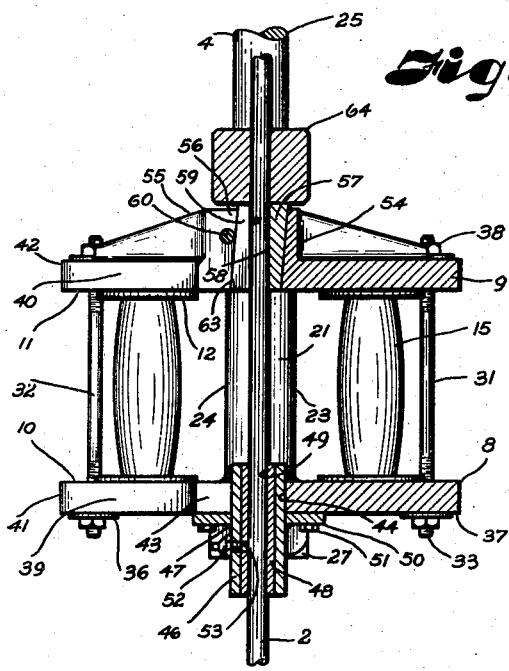
Fig. 4 is a vertical sectional view through the shock absorber on the line 4—4, Fig. 2.

Referring more in detail to the drawings:

1 designates a shock absorber structure serving as a connection between a polish rod 2 extending from a well head assembly 3 and hangers 4 suspended from one end of a walking beam 5 pivotally mounted as at 6 on a supporting frame 7.

The hanger 4 and its connection to the walking beam is of conventional form and construction.

The polish rod shock absorber 1 includes a lower or base plate 8 and an upper or head plate 9 having adjacent faces 10 and 11 respectively with vertically aligned bosses 12 extending therefrom. The bosses on the base plate 10 and head plate 11 have vertically aligned sockets 13 and 14 respectively for receiving end portions of cushion units or members 15. The cushion members 15 preferably are made of rubber or other suitable resilient flexible material and preferably are substantially cylindrical or barrel-shaped with a hollow interior 16 whereby the cushioning members may be inflated or filled with air under pressure if desired to increase the resistance to compression when subjected to forces from the ends thereof. It is to be understood that there are a plurality of cushion units 15 between the base and head plates 8 and 9, the number being such as to provide cushioning and shock absorbing for the load imparted on said plates.

The plates 8 and 9 each have aligned openings or slots 17 and 18 extending inwardly from the end edges 19 and 20 thereof and U-shaped guides 21 are suitably secured as by welding in the slots of one of the plates and extend through and slidably engage the slot in the other plate whereby said U-shaped members serve as guides for maintaining alignment of the plates 8 and 9 during relative movement thereof. The U-shaped members have open outer ends 22 at the ends of the plates 8 and 9 and the spaced walls 23 and 24 have a spacing whereby hanger rods 25 will extend therebetween. In the illustrated structure, the U-shaped members are welded to the base plate 8 and extend upwardly therefrom and are slidable in the slots 17 and 18 of the head plate 9. In the illustrated structure, the lower ends of the hanger rods 25 are threaded as at 26 with nuts 27 threaded on the lower ends thereof and washers 28 interposed between the nuts and the bottom of the base plate 8 to form the connection of the hanger to the base plate 8 whereby said base plate 8 is suspended from the rods 25 of the hanger structure 4. It is preferable that safety bars 29 extend across the open ends of the slots 17 and 18 to prevent accidental displacement of the hanger rods 25 from said slots. The safety bars 29 are preferably secured to the respective plates 8 and 9 by suitable fastening devices such as screws 30.

The cushion members 15 tend to urge the plates 8 and 9 apart, and such movement is limited by stop members 31. In the illustrated structure, the stop members include elongated rods 32 having threaded ends 33 which are slidable in and extend through aligned bores 34 and 35 in the plates 8 and 9 respectively. In the illustrated structure, the rods 32 and bores 34 and 35 are arranged adjacent each corner of rectangular plates 8 and 9. Washers 36 are sleeved on the rods to engage the outer faces 37 of the plates 8 and 9 and nuts 38 are threaded on said rod ends and adjusted to draw the plates 8 and 9 toward each other to provide a pre-loading of the cushion units 15 and limit the movement of said plate members one from the other.

The plates 8 and 9 have slots or lateral passages 39 and 40 extending inwardly from the sides 41 and 42 respectively, said slots converging toward the center of the respective plates. The converging sides of the slot 39 terminate as at 43 where the sides continue in parallel relation to an arcuate portion 44 forming polish rod openings intermediate the hanger rod openings. The arcuate portion 44 is defined by a radius from a center 45 that is coplanar with the axes of the hanger rods 25 located in the end slots 17 and 18, the radius of the arcuate portion in the base plate 8 being such that a sleeve 46 of a guide member 47 is received therein. The sleeve 46 is a cylindrical member having a bore in which a bearing member 48 is fixed. The bearing member 48 is preferably a bronze bushing having a bore 49 through which the polish rod 2 extends for longitudinal sliding movement therethrough, said polish rod being a close sliding fit in the bore 49 of said bushing. The upper portion of the sleeve 46 extends upwardly from the base plate 8 but the sleeve and bushing are relatively long to provide a long guide whereby a portion of the sleeve extends below the plate 8. A flange 50 is fixed to the sleeve 46 intermediate its ends and said flange secured to the bottom of the base plate 8 by suitable fastening devices such as screws 51. A lubrication fitting 52 is preferably arranged in the lower portion of the sleeve in communication with a bore 53 in the bushing whereby lubrication may be applied to the bushing and polish rod. The structure of the guide is such that when the fastening devices 51 are removed, the lower plate 8 can be moved from the polish rod with the guide member moving through the slot 39. The slot or lateral passage 40 in the head plate 9 substantially corresponds in shape to the slot 39 and said head plate 9 has an upstanding flange 54 around the inner portions of said slot with ribs 55 extending outwardly therefrom toward the corners of said plate to reinforce same. The inner portion of the slot 40 and inner surface defined by the upstanding rib 54 defines a polish rod opening 56 which tapers downwardly to receive a U-shaped insert or guide bushing 57 having a through bore 58 adapted to receive the polish rod 2, said insert 57 having a lateral passage 59 from the bore 58 to one side forming an open face insert with the passage opening toward the slot 40. The taper is such that the insert 57 will fit therein and the bore 58 will engage the polish rod extending therethrough while the bushing is extending out of the opening 56 formed by the ribs 54, and on downward movement of the bushing relative to the plate 8, the cooperating tapers on the insert and in the opening 56 will cause the legs of the bushing to be compressed to clamp a polish rod 2 therein. A bolt 60 extends through apertures 61 in the ribs 55 and has a nut 62 thereon to further compress the bushing by drawing the ribs together, said bolt serving to hold the bushing in the slot. It is preferable that the open face of the bushing be inclined downwardly and outwardly as at 63 to engage the bolt 60 whereby the taper of the bushing and the inclined face cooperate with the bolt and socket to retain the bushing against movement relative to the plate 9. A polish rod clamp 64 is adjusted on the polish rod above the guide bushing or insert 57 and secured thereto whereby the weight of the polish rod will be applied through the guide bushing 57 to the head plate 9.

In applying the shock absorber to a polish rod, the plates 8 and 9, cushion members 15 and stop members 31 are assembled, as illustrated and described. It is then moved to the well location, and the nuts 27 removed from the hanger rods. The fastening devices 51 are removed and bolts 60 removed whereby the guide bushing 57 may be lifted from the opening 56 in the plate 9. The polish rod clamp 64 is removed from the polish rod 2, and then the upper end of the polish rod 2 is inserted into the bore 49 of the guide bushing 48, and said guide moved downwardly on the polish rod. The shock absorber 1 is then swung whereby the polish rod enters the slots 39 and 40 and then the flange 50 is moved into engagement with the bottom of the plate 8 and the fastening devices 51 applied to secure the guide to said plate. The tapered guide or insert 57 is then moved onto the polish rod and inserted into the opening 56 and forced therein whereby the tapers on the guide and opening cause the insert 57 to grip the polish rod. The bolt 60 and nut 61 are then applied to hold the guide bushing or insert 57 in place. The polish rod clamp 64 is then placed on the polish rod and the fastening devices 65 tightened to secure the clamp to said rod in adjusted position. The apparatus is then in condition for the pumping of the well. The weight of the polish rods and loading thereon applies a downward force on the head plate 9, and the hangers apply an upward force on the base plate 8 compressing the cushion units 15. The reciprocation of the hangers 4 by operation of the walking beam 5 allows the weight on the polish rod to pull same downwardly on the down stroke, and on the up stroke the polish rod is raised to also raise liquid in the well. The reversal of forces normally subject polish rods to great stresses, vibration and impact shocks, but in the present structure, the rod is held substantially centered by the clamping action of the upper guide bushing 57, and the close fit of the rod in the bore of the bushing 48 in the lower guide 47 reduces the vibration. Lubricant is applied through the fitting 52 whereby the rod can reciprocate in the lower guide in response to compression and expansion of the cushion units 15.

It is believed obvious that I have provided an improved polish rod shock absorber to reduce vibration and wear on the polish rod and provide easily replaceable parts for economic operation.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A shock absorber for connecting a beam hanger and a polish rod of a well pump comprising, a base plate supported on the hanger, a head plate spaced above the base plate, a plurality of cushion units interposed between the base and head plates and urging said plates apart, said plates each having a polish rod opening substantially centrally thereof with lateral passages extending from said polish rod openings to a side of the respective plates, an elongate guide fixed to the base plate and sleeved on and slidable on the polish rod disposed in the polish rod opening in the base plate, the polish rod opening in the head plate having downwardly and inwardly tapered sides, a second guide having tapered sides seating in said tapered polish rod opening in the head plate, said second guide having a through bore with a lateral passage forming an open side toward the lateral passage in the head plate whereby the polish rod extends through said bore and the tapers of the second guide and polish rod opening in the head plate clamp said second guide on said polish rod, and a polish rod clamp on the polish rod resting on said second guide for supporting the polish rod.

2. A shock absorber for connecting a beam hanger and a polish rod of a well pump comprising, a base plate supported on the hanger, a head plate spaced above the base plate, a plurality of cushion units interposed between the base and head plates and urging said plates apart, a plurality of stop members on one of the plates and engageable with the other to limit the spacing between said head and base plates and apply a pre-loading on the cushion units, said plates each having a polish rod opening substantially centrally thereof with lateral passages extending from said polish rod openings to a side of the respective plates, an elongate guide sleeved on and slidable on the polish rod disposed in the polish rod opening in the base plate and extending downwardly therefrom, means removably securing said guide to the base plate, the polish rod opening in the head plate having downwardly and inwardly tapered sides, a second guide having tapered sides seating in said tapered polish rod opening in the head plate, said second guide having a through bore with a lateral passage forming an open side toward the lateral passage in the head plate whereby the polish rod extends through said bore and the tapers of the second guide and polish rod opening in the head plate clamp said second guide on said polish rod, means in the head plate retaining the second guide against vertical movement relative to said head plate, and a polish rod clamp on the polish rod resting on said second guide for supporting the polish rod.

3. A shock absorber for connecting a beam hanger and a polish rod of a well pump comprising, a base plate, a head plate spaced vertically above the base plate, said plates having aligned openings formed therethrough at their end portions for hanger rods to extend therethrough and connect to the base plate, guide means on one of the plates and slidably engaging the other for maintaining alignment of said plates during relative movement thereof, a plurality of cushion units interposed between the head and base plates and urging same apart, a polish rod opening in each of the plates intermediate the hanger rod openings, an elongate guide bushing having a portion disposed in the intermediate opening in the base plate and having a through bore slidably receiving said polish rod, means on said elongate bushing removably securing same to the base plate, said intermediate opening in the head plate having downwardly and inwardly tapered sides, an upper removable guide having tapered sides disposed in the intermediate opening of the head plate, said upper guide having a through bore for receiving said polish rod an a lateral slot extending from said bore whereby said tapers in the intermediate opening in the head plate and upper guide cooperate in response to downward movement of said upper guide in said intermediate opening of the head plate to effect clamping engagement of said upper guide with said polish rod, and a rod clamp secured to the polish rod and engaging said upper guide to support the polish rod thereon 4. A shock absorber for connecting a beam hanger and a polish rod of a well pump comprising, a base plate, a head plate spaced vertically above the base plate, said plates having aligned openings formed therethrough at their end portions for hanger rods to extend therethrough and connect to the base plate, guide means on one of the plates and slidably engaging the other for maintaining alignment of said plates during relative movement thereof, a plurality of cushion units interposed between the head and base plates and urging same apart, a polish rod opening in each of the plates intermediate the hanger rod openings with lateral passages extending from said polish rod openings to a side of the respective plate, an elongate guide bushing fixed to said base plate and having a portion disposed in the intermediate opening in the base plate and having a through bore slidably receiving said polish rod, an upper removable guide disposed in the intermediate opening of the head plate, said upper guide having a through bore for receiving said polish rod with a lateral passage extending from said bore to the side toward the lateral passage in said head plate, means on the head plate compressing said upper guide to effect clamping engagement of said upper guide with said polish rod, a rod clamp secured to the polish rod and engaging said upper guide to support the polish rod thereon, and means extending transversely of the lateral passage in the head plate adjacent said upper guide to restrain said upper guide against vertical movement relative to said head plate.

5. A shock absorber for connecting a beam hanger and a polish rod of a well pump comprising, a base plate, a head plate spaced vertically above the base plate, said plates having aligned openings formed therethrough at their end portions for hanger rods to extend therethrough and connect to the base plate, guide means on one of the plates and slidably engaging the other for maintaining alignment of said plates during relative movement thereof, a plurality of cushion units interposed between the head and base plates and urging same apart, stop means engaging said plates to limit spacing thereof and apply a pre-loading on the cushion units, a polish rod opening in each of the plates intermediate the hanger rod openings with lateral passages extending from said polish rod openings to the side of a respective plate, an elongate guide bushing having a portion disposed in the intermediate opening in the base plate and having a through bore slidably receiving said polish rod, means on said elongate bushing removably securing same to the base plate, said intermediate opening in the head plate having downwardly and inwardly tapered sides, an upper removable guide having tapered sides disposed in the intermediate opening of the head plate, said upper guide having a through bore for receiving said polish rod with a lateral passage extending from said bore to the side toward the lateral passage in said head plate whereby said tapers in the intermediate opening in the head plate and upper guide cooperate in response to downward movement of said upper guide in said intermediate opening of the head plate to effect clamping engagement of said upper guide with said polish rod, and a rod clamp secured to the polish rod and engaging said upper guide to support the polish rod thereon, and means extending transversely of the lateral passage in the head plate adjacent said upper guide to restrain said upper guide against vertical movement relative to said head plate.

References Cited in the file of this patent

UNITED STATES PATENTS

| | | |
|---|---|---|
| 2,125,861 | Deckard | Aug. 2, 1938 |
| 2,230,029 | Eaton | Jan. 28, 1941 |
| 2,241,409 | Mason | May 13, 1941 |

FOREIGN PATENTS

| | | |
|---|---|---|
| 225,792 | Great Britain | Dec. 11, 1924 |